2,759,003

PURIFICATION OF BETA-LACTONES BY AQUEOUS ALKALI EXTRACTION

Jacob E. Jansen, Akron, and Max E. Roha, Brecksville, Ohio, assignors to The B. F. Goodrich Company, New York, N. Y., a corporation of New York No Drawing. Application October 11, 1952, Serial No. 314,402

18 Claims. (Cl. 260—343.9)

This invention relates to a method of purifying beta-lactones by treating aqueous solutions of the lactones with alkaline materials and more particularly refers to a method of purifying beta-lactones in water solutions by controlled treatment, for relatively short periods of time, with alkaline reacting compounds at a pH of from about 7.5 to 12 and at a temperature below about 50° C.

It is disclosed in Frederick E. Küng Patent 2,356,459, issued August 22, 1944, that beta-lactones, that is lactones or inner esters of beta-hydroxy carboxylic acids, can be obtained in good yields by the reaction of a ketene with an aldehyde or ketone. The beta-lactones prepared in this manner have the general structure

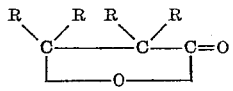

in which each R represents either a hydrogen atom, a hydrocarbon or a substituted hydrocarbon radical free of carboxyl groups. The preferred beta-lactones are those that are water soluble.

The beta-lactones prepared by the methods described in the above mentioned Küng patent contain small but significant amounts of impurities which for some purposes are undesirable. These impurities include free acids such as acetic, acrylic and beta-chloropropionic; acid anhydrides such as acetic and acrylic; some unreacted ketene and aldehyde or ketone; and other compounds in small quantities through side reactions between the several ingredients of the main reaction mixture.

Heretofore, the most suitable, but not entirely satisfactory, method of purifying beta-lactones, was that in which a highly efficient fractional distillation was used. Among the shortcomings of this distillation method is the fact that it is slow and relatively expensive and, further, there is considerable homopolymerization of the lactone monomer due to the long exposure to elevated temperatures.

Ordinarily, if alkalis are added to aqueous solutions of beta-lactones, there results a fairly rapid reaction between the base and the inner ester. For instance, when a strong solution of an alkali metal hydroxide is added to a water solution of a beta-lactone, so that the mixture becomes and remains strongly alkaline, the inner ester linkage of the lactone is broken to form salts of a beta-hydroxy carboxylic acid. Water-soluble carbonates catalyse the polymerization of beta-lactones.

We have now discovered, however, that if an alkaline compound is added to beta-lactones in the presence of water under carefully controlled conditions, reaction between the base and the beta-lactone is reduced to insignificant proportions, but at the same time the alkaline material will react with the acidic impurities to render them insoluble in an inert volatile organic solvent that is immiscible with water. Thus, if the alkaline compound is added cautiously, so as to keep the pH of the mixture between about 7.5 and 12 or slightly above, while maintaining the temperature below 50° C. and limiting the time of the reaction to not more than about 10–15 minutes, and thereafter separating the lactone from the aqueous mixture, beta-lactones of a very high degree of purity can be obtained in very good yield.

The alkaline compounds that we found to be especially satisfactory include alkaline buffers, oxides, hydroxides, carbonates and bicarbonates of alkali and alkaline earth metals, and mixtures thereof. Other alkaline hydroxides, oxides or salts which produce an alkaline reaction in water can also be used. The alkaline compound does not necessarily have to be very soluble in water, but in order to obviate the necessity of filtering after purifying the beta-lactones, water-soluble alkaline materials are desirable. The alkali metal hydroxides are preferred. Specific examples of alkaline compounds are sodium, potassium and lithium oxides, hydroxides, bicarbonates and carbonates, calcium, magnesium, strontium and barium hydroxides, oxides and carbonates and alkaline ammonium compounds. Other inorganic alkaline compounds are satisfactory if they are capable of raising the pH of the mixture between 7.5 and 12 and maintaining it in substantially that range by addition of the alkaline material as needed.

The purification of beta-lactones is most rapid and effective at a pH of about 8 to 10. If the pH is considerably below 8, the reaction is slow and the acid and acid-yielding impurities are not as efficiently removed, and if the pH is considerably above 10 the reaction between the beta-lactone, the alkaline compound and the salts of the acids is of such scope as to materially reduce the yield of the lactone monomer. The preferred pH range is from about 9 to 9.5.

Care must be exercised to prevent local points of pH considerably above 12. This is best done by slowly adding a solution or slurry of the alkaline compound while vigorously stirring the water solution of beta-lactone and making frequent or constant checks of the pH of the mixture during alkali addition.

The temperature at which purification of the beta-lactones can take place is between the solidification point of the mixture, which is below 0° C., and about 40–50° C. The preferred range is between about —20° C. and +25° C. The reaction is exothermic and therefore cooling of the reaction mixture may be necessary to maintain the temperature within the preferred range.

In our tests, we found that alkali consumption and pH fluctuation from high to low is greatest in the initial stages of the reaction.

The bulk of the alkali necessary to attain and hold the mixture at a pH range of 7.5 to 12 is neutralized by the free acid or by hydrolytic products of acid anhydrides, within about three or four minutes after starting addition of the base. The vigorous stirring of the mixture disperses the alkaline compound throughout the liquid mass, so that the neutralization of acids and hydrolysis of anhydrides can proceed at the specified pH, without forming localized spots of substantially higher pH values. After the free acid-free base reaction is completed, additional small amounts of alkali may be required to completely hydrolize the acid anhydrides and keep the pH within the proper range.

For best results it is desirable to permit the reaction to proceed for about a few seconds to about 10–15 minutes after reaching the desired pH, to provide a period for hydrolysis of acid anhydrides and neutralization of the resulting acids.

Extraction of the so-treated beta-lactone should begin as soon as possible after the end of the acid and acid anhydride neutralization period. Prolonged standing at reaction temperature results in a reaction between the lactone and the alkali or salts formed through neutralization of the acids, to form beta-hydroxy carboxylic acids or lactone polymers and thus decreases the yield of purified lactone.

Any inert volatile organic liquid that is immiscible with water, but which readily dissolves the beta-lactone, can be employed to separate the lactone from the reaction mixture. Examples of such liquids are carbon tetrachloride, chloroform, diethylene chloride, diethyl ether, chlorinated ethers, liquid aromatic hydrocarbons and halogenated aromatic hydrocarbons such as benzene, toluene, xylene and the like. The preferred solvent is chloroform.

The volatile organic solvent can be removed from the beta-lactone by distillation to yield lactones of a very high degree of purity. Beta-lactones having an acidity calculated in milliequivalents per gram (m. eq./g.) well below 0.1 and most often between 0.03 and 0.05 can be consistently obtained.

The beta-lactones that can be purified by our method include beta propiolactone, beta-hydroxy butyric acid lactone, alpha-methyl beta-propiolactone, beta-hydroxy-n-valeric acid lactone, beta-hydroxy alpha-methyl butyric acid lactone, alpha-ethyl beta-propiolactone, beta-hydroxy isovaleric acid lactone, beta-hydroxy-n-caproic acid lactone, beta-hydroxy alpha-methyl valeric acid lactone, beta-methyl beta-ethyl beta-propiolactone, alpha-methyl beta-ethyl beta-propiolactone, alpha-propyl beta-propiolactone and the like; beta lactones of substituted aliphatic carboxylic acids such as beta-phenyl beta-propiolactone, alpha-phenyl beta-propiolactone, beta-chloro-ethyl beta-propiolactone, beta-benzyl beta-propiolactone, beta-cyclohexyl beta-propiolactone and the like and other lactones of the general type described above.

Our novel methods can be used for purifying distilled, flashed or crude beta-lactones or beta-lactones containing added acetic anhydride. The process is applicable to both batch and continuous purification procedures, as will be apparent from the specific examples set forth herein.

*Example 1*

A solution of 100 g. of flash-distilled beta-propiolactone of 84.5% purity, having an acidity of 0.801 milliequivalents per gram, was prepared by dissolving it in 375 grams of water. The temperature was maintained between 10°–15° C. and the solution of lactone was stirred vigorously during addition of 6 N—NaOH solution. The pH of the mixture was held at about 9 throughout the entire purification cycle, which required about 10 minutes. At the expiration of this period, the purified lactone was extracted with three 100 ml. portions of chloroform. The latter solution was separated by distillation. The beta-propiolactone fraction, which boiled at 50° C. at 12 mm. pressure, analyzed 98.2% lactone and had an acidity of .006 milliequivalent per gram. The recovery of lactone was greater than 95%.

In the first two or three minutes of the purification procedure, alkali consumption was rapid. Thereafter the amount of base used leveled off, but titration was continued for about seven minutes to provide ample time for hydrolysis of all the acid anhydrides present in the mixture.

When neutralization of the free acids and acid anhydrides is effected, the extraction with a water-immiscible solvent should take place without undue delay. Otherwise, the free alkali will react with purified beta-lactone to form a beta-hydroxy acid which will recontaminate the lactone. Tests have shown that if a lactone-alkali mixture is permitted to stand, there is a progressively significant increase in acidity in 15 to 30 minutes.

*Example 2*

The process described under Example 1 was repeated with crude beta-propiolactone containing about 80.0% lactone and an acidity of 0.8 milliequivalent per gram. Through the alkali purification treatment, a lactone having 99.1% purity and an acidity of .004 m. eq./g. was recovered in excellent yield.

*Example 3*

A beta-propiolactone-acetic anhydride mixture, having an acidity of .749 m. eq./g. was subjected to the procedure of Example 1. The purified lactone had a purity of 98.3% and an acidity of .006 m. eq./g.

*Example 4*

A 0.5% water solution of sodium hydroxide and a flash-distilled beta-propiolactone analyzing 83.5% lactone and having an acidity of .206 m. eq./g. were pre-cooled with circulating ice water prior to being fed simultaneously and continuously into the bottom of a high speed mixer which was cooled with circulating acetone at −10° C.

The proportion of each component (about 6 parts by volume of alkali solution for each part lactone) was regulated, so that the lactone was completely dissolved in the alkali solution and the amount of alkaline solution was such that a small excess of alkali, above that required to neutralize all the acids in the lactone and sufficient to raise the mixture to a pH of 9 to 10, was present.

As the treated lactone-alkali solution emerged from the mixer, it was again cooled by circulating acetone at −10° C. The mixture, which contained about 17% lactone, was then pumped through a dispersing head into the bottom of a packed extraction column filled with chloroform. This column was cooled with circulating water. Controlled amounts of chloroform were continuously fed into the top of the extraction unit and withdrawn from the bottom. The aqueous raffinate was withdrawn from the top of the extractor. The extraction was run close to the flood stage with respect to the water-immiscible solvent. In this manner, the aqueous mixture of lactone and alkali was in contact with chloroform for substantially the entire length of the extracting column.

A total of about two minutes expired from the time the lactone and alkali solution entered the mixer to the time the mixture entered the extraction apparatus. After the aqueous phase was introduced into the base of the column, about four minutes elapsed before it appeared at the top.

The purified lactone which was separated from the chloroform by distillation, had a purity of 98.2% and an acidity of .034 m. eq./g. The yield was 93.6%.

*Example 5*

A procedure similar to that of Example 4, but in which a pressure mixer was substituted, was employed in purifying a sample of beta-propiolactone that was previously fractionally distilled. Before treatment this sample had a lactone content of 95.3% and an acidity of 0.408 m. eq./g. After purification the lactone content was 99.56% and the acidity was .057 m. eq./g. The overall recovery of lactone was 89.6%. In this run a ratio of about 5.4 grams of approximately 0.5% aqueous sodium hydroxide solution for each gram of lactone was used.

In each of these examples a water-soluble lactone is purified and extracted with a water-immiscible solvent. It is to be understood, however, that modifications of these steps are possible. For instance, the lactones containing acid and acid-forming impurities can be first dissolved in a water-immiscible solvent, such as a halogenated aliphatic hydrocarbon or aromatic hydrocarbon, and vigorously stirred with an aqueous alkaline material of the type described. The aqueous and water-immiscible phases can then be separated by any well-known means, including decantation, centrifugation or other gravitational means.

Beta-lactones which are very sparingly soluble in water can be treated by this latter method. As an alternative process, the sparingly soluble lactones can be stirred vigorously with an aqueous alkaline material and then separated from the water layer without the use of an extracting solvent. Any well-known method of separating two immiscible liquids can be used for this purpose. Gravitational means, decantation and centrifugation are satisfactory.

If any of the modified methods are employed, it is essential that the pH and temperature be regulated within the limits set out above in order to reduce side reactions of the lactone to a minimum. Because of the ease with which the acid and acid-forming impurities dissolve in the water-immiscible lactone or extracting solvent the rate of removal of impurities is usually somewhat slower than in water solution and for that reason it may be necessary to increase the mixing time to about 15 minutes or slightly more before hydrolysis of acid anhydrides is complete.

Although sodium hydroxide is the alkaline material employed in the specific examples described above, it is to be understood that any other material which is insoluble in the water-immiscible extracting solvent and capable of raising the lactone-water mixture to a pH of 7.5 or higher can be substituted. The solubility of the alkaline material in water need not be high. Calcium and magnesium oxides whose water solubilities are very low have been used to purify the lactones. Mixtures of alkaline-reacting inorganic materials can be used. When water-soluble carbonates are employed, it is necessary to avoid long contact between the salt and the lactone. These carbonates are known to catalyse the formation of lactone polymers, through unstable intermediates. The polymers have characteristics considerably different from the monomers and are undesirable for our present purposes. When such carbonates are used it is also desirable to keep the reaction temperature as low as possible. Even though all precautions are taken, yields with carbonates are usually lower than those where soluble hydroxides or relatively insoluble oxides act as the purifying ingredients.

Alkaline ammonia compounds also react fairly rapidly with beta-lactones, and the same precautions should be used as those described for water-soluble carbonates.

The mechanism by which the purification of beta-lactones is effected is believed to be one which involves differences in reaction rate under the particular pH and temperature conditions. Thus, the rate between the acids and acid anhydrides and the alkaline material in the aqueous mixture is appreciably greater than that between the alkaline material and the lactone. As a consequence, salts of the acids and acid-forming substances are formed before the alkaline material can react with the lactones, so that there is little loss of lactone during this stage of the purification. If, at this point, a water-immiscible solvent is added to the mixture, the lactone is separated from the alkaline material and there is no further possibility of lactone hydrolysis. Other means of rapidly separating the lactone from the aqueous alkaline material are also useful.

The small amounts of acetone, formaldehyde or other unreacted, water-soluble components used in preparing the beta-lactones are much more soluble in water than in the extracting organic solvent, and, therefore, they are retained in the aqueous phase during the lactone extraction.

The purified beta-lactones have many useful purposes, primary among which is that they serve as starting materials for synthesis of many organic derivatives, as, for example, the conversion of beta-propiolactone to acrylic acid.

Although specific examples of the invention have been described, it is not intended to limit the invention solely thereto, but to include all of the variations and modifications falling within the spirit and scope of the appended claims.

We claim:

1. A method of purifying lactones containing acid and acid-forming impurities comprising, bringing together, in the presence of water, an inorganic alkaline material selected from the class consisting of alkali metal and alkaline earth metal oxides, hydroxides, carbonates and bicarbonates, and a beta-lactone having the structure

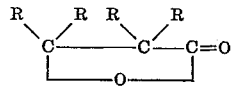

in which each R represent a hydrogen atom and a hydrocarbon group, said beta-lactone having a total from 3 to about 10 carbon atoms, maintaining the pH of the mixture at about 7.5 to about 12, for a time sufficient to react with said acid and acid-forming impurities but insufficient to react substantially with said beta-lactone, keeping the temperature of the mixture below about 50° C. during the alkaline treatment and separating the purified lactone from the water.

2. The method of claim 1 in which the alkaline material is sodium hydroxide.

3. The method of claim 1 in which the alkaline material is potassium hydroxide.

4. A method of purifying lactones containing acid and acid-forming impurities comprising, bringing together, in the presence of water, an inorganic alkaline material selected from the class consisting of alkali metal and alkaline earth metal oxides, hydroxides, carbonates and bicarbonates and a beta-lactone having the general formula

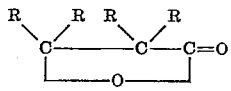

in which each R represents hydrogen and a saturated hydrocarbon group, said beta-lactone having from 3 to 10 carbon atoms, maintaining the pH of the mixture between about 7.5 and 12 for a period up to about 15 minutes, keeping the temperature of the mixture between about −20° C. and +25° C. during the alkaline treatment and extracting the purified beta-lactone with an inert, volatile, water-immiscible organic solvent.

5. The method of claim 4 in which the temperature ranges from about 0° C. to about 15° C.

6. The method of claim 4 in which the lactone is beta-propiolactone.

7. The method of claim 4 in which the alkaline material is sodium hydroxide.

8. The method of claim 4 in which the alkaline material is potassium hydroxide.

9. A method of purifying lactones containing acid and acid-forming impurities comprising, bringing together, in the presence of water, an inorganic material selected from the class consisting of alkali metal and alkaline earth metal oxides, hydroxides, carbonates and bicarbonates and beta-propiolactone, maintaining the pH of the mixture between about 7.5 and 12 for a period up to about 15 minutes, keeping the temperature of the mixture below about 50° C. during the alkaline treatment and extracting the purified lactone with an inert, volatile, water-immiscible, organic solvent.

10. The method of claim 9 in which the alkaline material is sodium hydroxide.

11. The method of claim 9 in which the alkaline material is potassium hydroxide.

12. A method of purifying lactones containing acid and acid-forming impurities comprising, bringing together beta-propiolactone, water and an inorganic alkaline material selected from the class consisting of alkali metal and alkaline earth metal oxides, hydroxides, carbonates and bicarbonates, adjusting the pH of the mixture between about 9 and 10, maintaining the pH range for a period not greater than 15 minutes, keeping the temperature below 50° C. during the alkaline treatment and extracting the purified lactone with an inert, volatile, water-immiscible, organic solvent.

13. A method of purifying lactones containing acid and acid-forming impurities comprising, bringing together, in the presence of water, an inorganic alkaline material selected from the class consisting of alkali metal and alkaline earth metal oxides, hydroxides, carbonates and bicarbonates and a beta-lactone having the structure

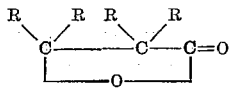

in which each R represents a hydrogen atom and a hydrocarbon group, said beta-lactone having a total of from 3 to 10 carbon atoms, maintaining the pH of the mixture at about 9 to about 10 for a period up to about 15 minutes, keeping the temperature of the mixture between about −20° C. and +25° C. during the alkaline treatment and extracting the purified lactone with an inert, water-immiscible volatile organic solvent.

14. A method of purifying lactones containing acid and acid-forming impurities comprising adding to a water solution of beta-propiolactone a water solution of sodium hydroxide in increments, maintaining the pH of the mixture between about 9 and 10 for a period not greater than 15 minutes, keeping the temperature of the mixture between about 0° C. and 15° C. while the mixture has an alkaline reaction and extracting the purified beta-propiolactone with an inert, volatile, organic solvent, selected from the class consisting of chloroform, carbon tetrachloride, ethylene dichloride, diethyl ether and dichlorodiethyl ether.

15. The method of claim 14 in which the extracting solvent is chloroform.

16. A method of purifying lactones containing acid and acid-forming impurities comprising continuously bringing together beta-propiolactone and a water solution of sodium hydroxide in proportions sufficient to neutralize the free acids and acid anhydrides and bring the pH of the mixture from about 9 to 10, while maintaining the temperature of the mixture below 25° C., and extracting the purified beta-propiolactone within fifteen minutes after bringing the alkali metal hydroxide and lactone together, with an inert, volatile, water-immiscible organic solvent.

17. The method of claim 16 in which the extracting solvent is selected from the class consisting of chloroform, carbon tetrachloride, ethylene dichloride, diethyl ether and dichlorodiethyl ether.

18. The method of claim 17 in which the extracting solvent is chloroform.

References Cited in the file of this patent

FOREIGN PATENTS 660,405   Great Britain _____ Nov. 7, 1951

OTHER REFERENCES

Gresham et al.: JACS 73, 3168–9, July 1951.